United States Patent
Kato (10) Patent No.: US 9,216,740 B2
(45) Date of Patent: Dec. 22, 2015

(54) DRIVING SUPPORT SYSTEM

(75) Inventor: Hideki Kato, Machida (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 269 days.

(21) Appl. No.: 13/640,862

(22) PCT Filed: Jun. 15, 2010

(86) PCT No.: PCT/JP2010/060115
§ 371 (c)(1),
(2), (4) Date: Oct. 12, 2012

(87) PCT Pub. No.: WO2011/158327
PCT Pub. Date: Dec. 22, 2011

(65) Prior Publication Data
US 2013/0030666 A1 Jan. 31, 2013

(51) Int. Cl.
*G06F 7/70* (2006.01)
*G06F 19/00* (2011.01)
*G06G 7/00* (2006.01)
*G06G 7/76* (2006.01)
*B60W 30/18* (2012.01)
*B60K 31/00* (2006.01)

(52) U.S. Cl.
CPC .......... *B60W 30/18027* (2013.01); *B60K 31/00* (2013.01); *B60W 30/18063* (2013.01); *B60W 2540/12* (2013.01); *B60W 2720/10* (2013.01); *B60W 2720/106* (2013.01)

(58) Field of Classification Search
CPC .............................. B60K 31/00; B60R 21/013
USPC .................. 701/70, 72, 96; 180/169, 170
See application file for complete search history.

(56) References Cited

U.S. PATENT DOCUMENTS 5,166,681 A * 11/1992 Bottesch et al. ............... 340/933
2007/0215401 A1 * 9/2007 Braeuchle et al. ............. 180/170

FOREIGN PATENT DOCUMENTS

| JP | 5 85319 | 4/1993 |
| JP | 10 29511 | 2/1998 |
| JP | 2003 146117 | 5/2003 |
| JP | 2003146117 A * | 5/2003 |
| JP | 2008 1337 | 1/2008 |
| JP | 2008 279924 | 11/2008 |
| JP | 2009 214745 | 9/2009 |
| JP | 2009214745 A * | 9/2009 |

OTHER PUBLICATIONS

International Search Report Issued Oct. 12, 2010 in PCT/JP10/060115 Filed Jun. 15, 2010.

* cited by examiner

*Primary Examiner* — Tuan C. To
*Assistant Examiner* — Isaac Smith
(74) *Attorney, Agent, or Firm* — Oblon, McClelland, Maier & Neustadt, L.L.P.

(57) ABSTRACT

An electronic control unit is provided with a braking device formed of a brake pedal which exerts braking force on a vehicle, a brake actuator, braking units and the like, a vehicle speed change rate setting device which sets a target vehicle speed change rate, and a vehicle speed control device which performs vehicle speed control to realize the target vehicle speed change rate by predetermined operation to the braking device performed by a driver. The vehicle speed change rate setting device sets a target vehicle speed change rate to accelerate the vehicle when the predetermined operation is performed while the vehicle stops, for example.

20 Claims, 4 Drawing Sheets

DRIVING SUPPORT SYSTEM

FIELD

The present invention relates to a driving support system which supports operation of a driver of a vehicle.

BACKGROUND

Conventionally, a vehicle stop holding device, which holds a stopped state of the vehicle, is known as one of the driving support systems. The vehicle stop holding device is configured to hold predetermined magnitude of braking force of the vehicle by braking force control to hold the stopped state of the vehicle. For example, following Patent Literature 1 discloses technology to cancel a held state of the braking force when a brake pedal is depressed to a predetermined position or deeper by the driver during maintenance operation of the braking force. Also, following Patent Literature 2 discloses the driving support system (running control device), which relieves pedal changing operation of the driver. The running control device controls driving force in a deep operational range of an accelerator pedal and controls the braking force in a shallow operational range thereof and on the other hand, controls the braking force in the deep operational range of the brake pedal and controls the driving force in the shallow operational range thereof in an operation decreasing mode.

Meanwhile, following Patent Literature 3 discloses technology of a braking device, which performs vehicle stop holding control by the braking force control when a parking brake is not activated, to inhibit the vehicle stop holding control from being executed during a predetermined time immediately after the parking brake is released and thereafter allow the vehicle stop holding control to be executed. An object of the technology is to start the vehicle without accelerator operation on a flat road or a slope in a state in which an automatic transmission is shifted to a D range or an N range by inhibiting the vehicle stop holding control from being performed during the predetermined time immediately after the parking brake is released.

CITATION LIST

Patent Literature

Patent Literature 1: Japanese Patent Application Laid-open No. H10-029511
Patent Literature 2: Japanese Patent Application Laid-open No. 2003-146117
Patent Literature 3: Japanese Patent Application Laid-open No. H05-085319

SUMMARY

Technical Problem

In the technology disclosed in Patent Literature 1 described above, although the held state of the braking force can be canceled by depressing operation of the brake pedal by the driver, a change rate of a vehicle speed after a start cannot be specified by the driver by the operation of the brake pedal. In such vehicle, when a mounted transmission is the automatic transmission with which creeping is possible, it is possible to start by decreasing an amount of the depressing operation of the brake pedal or by taking a foot off the brake pedal after the vehicle stop holding control is canceled. However, the driver cannot specify the change rate of the vehicle speed after the start until he/she depresses the accelerator pedal, so that the vehicle speed might be deficient depending on a traffic situation such as a traffic jam in a very-low speed running by the creeping in the traffic jam and the like, for example, and the accelerator operation by the driver might be required for solving the deficiency. Also, since the traffic situation changes every second, the brake operation might be required immediately after the accelerator operation. In this manner, in the conventional vehicle, change between the brake pedal and the accelerator pedal is required after the vehicle stop holding control is canceled and this might be operational burden of the driver.

Herein, in the technology disclosed in the Patent Literature 2 described above, the braking force control and driving force control are switched by the amount of the depressing operation of the brake pedal, so that the vehicle may start by decrease in the amount of the depressing operation. However, as for the technology also, the driver does not specify the change rate of the vehicle speed after the start by the operation of the brake pedal, so that the changing operation between the brake pedal and the accelerator pedal might be required. Although it is possible to change the change rate of the vehicle speed by adjusting the driving force in this technology, the driving force control is performed during the operation of the brake pedal, so that it is required to change the driving force by finely adjusting the operation amount of the brake pedal in order that the driver may specify the change rate of the vehicle speed in this technology, and this might be the operational burden of the driver.

Then, an object of the present invention is to improve disadvantage of such conventional example and to provide the driving support system with which the driver can set the change rate of the vehicle speed by simple operation.

Solution to Problem

In order to achieve the above mentioned object, a driving support system according to the present invention includes a braking device configured to exert braking force on a vehicle; a vehicle speed change rate setting device configured to set a target vehicle speed change rate; and a vehicle speed control device configured to perform vehicle speed control to realize the target vehicle speed change rate by predetermined operation to the braking device performed by a driver.

Here, it is desirable that the vehicle speed change rate setting device sets a target vehicle speed change rate to accelerate the vehicle when the predetermined operation is performed while the vehicle stops.

Further, it is desirable that the vehicle speed change rate setting device sets a target vehicle speed change rate to hold a vehicle speed at the time of the predetermined operation when the predetermined operation is performed during acceleration.

Further, it is desirable that the vehicle speed change rate setting device sets a target vehicle speed change rate to accelerate the vehicle when the predetermined operation is performed during constant-speed running.

Further, it is desirable that the vehicle speed change rate setting device sets a target vehicle speed change rate to decelerate the vehicle when operation other than the predetermined operation is performed to the braking device during the acceleration or the constant-speed running.

Further, it is desirable that the vehicle speed change rate setting device sets the target vehicle speed change rate in a vehicle speed region not higher than an upper limit vehicle speed.

Further, a forward condition confirming device configured to confirm presence of another vehicle or an obstacle in front of an own vehicle is provided. And, it is desirable that the vehicle speed control device performs the vehicle speed control to realize the target vehicle speed change rate set by the target vehicle speed change rate setting device, when the forward condition confirming device does not detect the other vehicle or the obstacle.

Further, it is desirable that the vehicle speed change rate setting device sets the target vehicle speed change rate according to behavior of another vehicle in front.

Here, it is desirable that the behavior of the other vehicle in front is at least one of a relative position, a relative speed, and relative acceleration, between an own vehicle and the other vehicle.

Advantageous Effects of Invention

In the driving support system according to the present invention, the driver can drive by changing the target vehicle speed change rate by performing simple predetermined operation to the braking device (specifically, the brake pedal). For example, the driving support system can start from the stopped state of the vehicle or switch to the constant-speed running during the acceleration running by the operation by the driver. Therefore, the driving support system is capable of eliminating or decreasing the changing operation between the brake pedal and the accelerator pedal by the driver under a predetermined requirement such as a very-low speed region, so that this can relieve the operational burden of the driver.

DESCRIPTION OF EMBODIMENTS

Embodiments of a driving support system according to the present invention are hereinafter described in detail with reference to the drawings. Meanwhile, the invention is not limited by the embodiments.

[First Embodiment]

Figure 1:
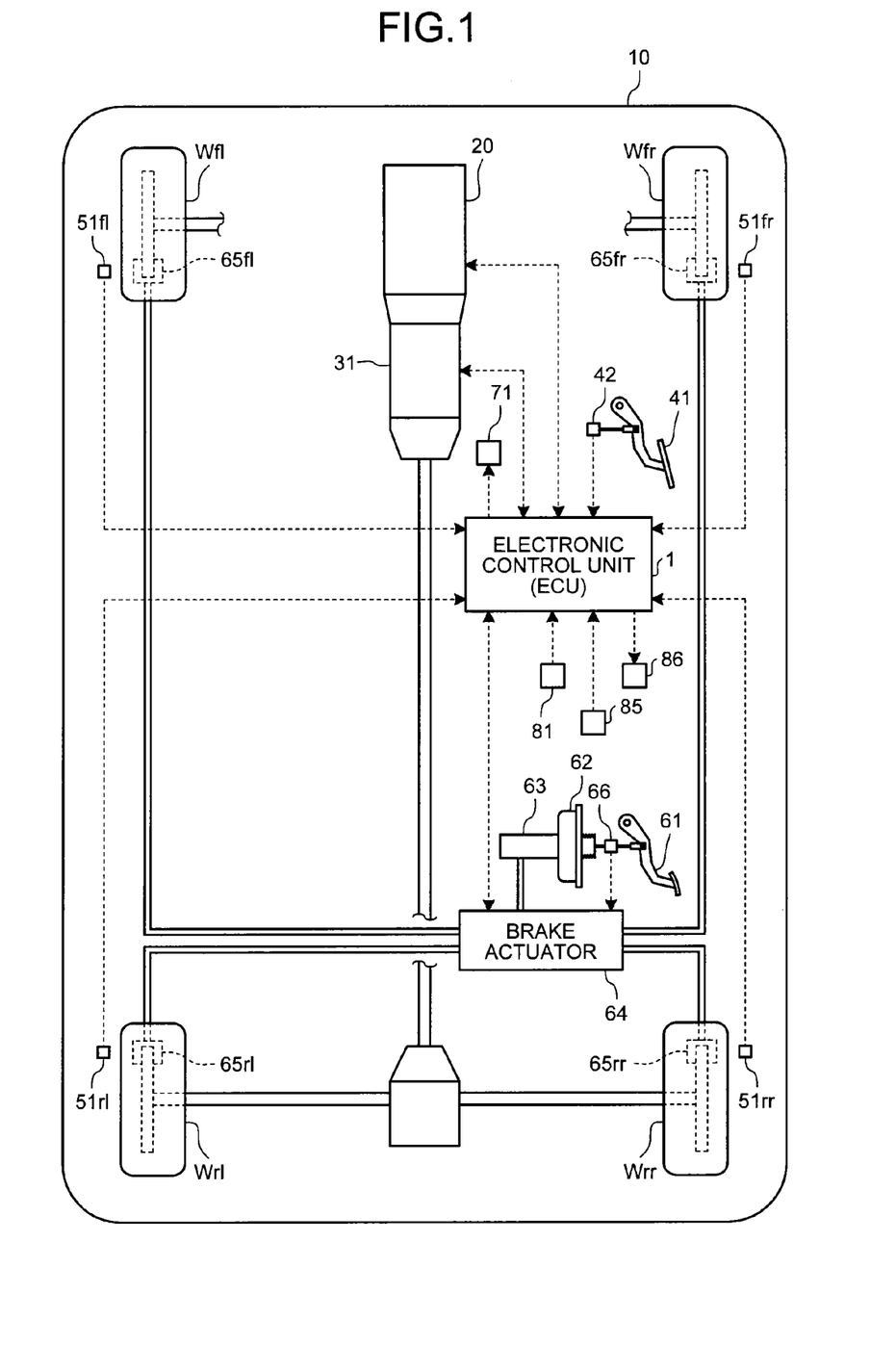
FIG. 1 is a view illustrating an example of a vehicle to which a driving support system according to the present invention is applied.

A first embodiment of a driving support system according to the present invention is described with reference to FIGS. 1 to 3.

First, an example of a vehicle to which the driving support system is applied is described. Herein, a FR (front-engine rear-wheel-drive) vehicle illustrated in FIG. 1 described as an example. A vehicle 10 is controlled by an electronic control unit (ECU) 1 illustrated in FIG. 1. The driving support system is provided with a braking/driving force control device, a transmission control device, a vehicle stop holding control device, a vehicle speed change rate setting device and the like to be described later.

The braking/driving force control device is provided as one of control functions of the electronic control unit 1. The braking/driving force control device performs driving force control of which target is a driving device and braking force control of which target is a braking device to be described later. The braking/driving force control device executes vehicle speed control by the driving force control and the braking force control, so that this may be referred to as a vehicle speed control device. The vehicle speed control includes constant-speed running control when a vehicle speed change rate is 0, acceleration running control when the vehicle speed change rate is a positive value, and deceleration running control when the vehicle speed change rate is a negative value. The vehicle speed change rate is intended to mean a change rate of a vehicle speed with respect to an elapsed time and corresponds to acceleration or deceleration.

The driving device of the vehicle 10 is configured to exert driving force on the vehicle 10 and is provided with a power source 20, which generates driving torque, and a power transmitting unit such as a transmission 31, which transmits the driving torque to driving wheels Wrl and Wrr. The power source 20 is controlled by the braking/driving force control device (electronic control unit 1) to output target driving torque. The transmission 31 herein described as an example is a stepped or continuous automatic transmission of which transmission gear stage or transmission ratio is controlled by the transmission control device, which is one of the control functions of the electronic control unit 1. In the vehicle 10, since the vehicle speed also changes by change of the transmission gear stage or the transmission ratio, the transmission control device can execute the vehicle speed control by transmission control of the transmission 31, so that this may also be referred to as the vehicle speed control device.

At least one of a mechanical power source of which power is mechanical energy obtained by converting heat energy and an electric power source of which power is the mechanical energy obtained by converting electric energy is used as the power source 20. The mechanical power source is intended to mean an engine, which outputs mechanical power (engine torque) from an output shaft (crankshaft) and this may be an internal-combustion engine, an external-combustion engine and the like. The electric power source is intended to mean any one of a motor, which outputs the mechanical power (motor torque) from the output shaft (rotor), a generator, which enables power running drive, and a motor/generator, which enables the power running drive and regenerative drive. In this exemplification, the engine is used as the power source 20.

The electronic control unit 1 may perform at least one of control of the target driving torque of the power source 20 by the braking/driving force control device and control of the transmission gear stage (transmission ratio) of the transmission 31 by the transmission control device, thereby controlling the driving force of the driving wheels Wrl and Wrr to adjust the vehicle speed. For example, the braking/driving force control device sets the target driving torque of the power source 20 based on an amount of depressing operation of an accelerator pedal 41 by a driver (hereinafter, referred to as an "accelerator operation amount"), a current vehicle speed, a current transmission gear stage (transmission ratio) or the transmission gear stage (transmission ratio) after gear shift of the transmission 31. The accelerator operation amount is an accelerator opening degree, for example, detected by an accelerator operation amount detecting unit 42 such as an accelerator opening degree sensor. The vehicle speed is detected or estimated by a vehicle speed detecting device. Herein, the vehicle speed is estimated based on wheel speeds detected by wheel speed detecting units 51$fl$, 51$fr$, 51$rl$, and 51$rr$ such as wheel speed sensors in wheels Wfl, Wfr, Wrl, and Wrr, respectively. The braking/driving force control device controls fuel injection timing and the like of the power source 20 in order to realize the target driving torque.

Next, the braking device, which exerts braking force on the vehicle 10, is described. The braking device is provided with a brake pedal 61 operated by the driver, a brake booster 62, which doubles pedal force input to the brake pedal 61, a master cylinder 63, which converts the pedal force doubled by the brake booster 62 to fluid pressure (hydraulic pressure) of brake fluid, a hydraulic adjusting unit (hereinafter, referred to as a "brake actuator") 64 capable of adjusting the converted brake fluid pressure for each of the wheels Wfl, Wfr, Wrl, and Wrr, and braking units 65$fl$, 65$fr$, 65$rl$, and 65$rr$ each formed of a caliper, a rotor and the like supplied with the brake fluid pressure through the brake actuator 64 to generate the braking force in the wheels Wfl, Wfr, Wrl, and Wrr, respectively.

The braking/driving force control device (electronic control unit 1) can generate the braking force of different magnitude for the wheels Wfl, Wfr, Wrl, and Wrr by controlling the brake actuator 64 irrespective of presence of operation of the brake pedal 61 by the driver (hereinafter, referred to as "brake operation"). Therefore, the braking/driving force control device can control the braking force of each of the wheels Wfl, Wfr, Wrl, and Wrr by the control of the brake actuator 64 to adjust the vehicle speed.

The vehicle 10 is also provided with a vehicle stop holding device, which holds a stopped state of the vehicle 10 by the braking force control. The vehicle stop holding device is a device, which performs a so-called brake hold function, and can hold the stopped state of the vehicle even when the driver takes his/her foot off the brake pedal 61. The braking device, especially the brake actuator 64, the braking units 65$fl$, 65$fr$, 65$rl$ and 65$rr$ and the like are used as the vehicle stop holding device.

The electronic control unit 1, which serves as the vehicle stop holding control device, controls the brake actuator 64 to apply the brake fluid pressure of predetermined magnitude to the wheels Wfl, Wfr, Wrl, and Wrr and holds the braking force generated along with this, thereby performing vehicle stop holding control. The magnitude of the brake fluid pressure (braking force) is set such that the stopped state of the vehicle can be held in consideration of a gradient of a road surface and the like.

For example, a vehicle stop holding control switching unit such as a selection switch, which allows the driver to switch necessity of execution of the vehicle stop holding control, is provided in a cabin of the vehicle. When it is in a vehicle stop holding control on-state by receiving a control on-signal from the vehicle stop holding control switching unit, the vehicle stop holding control device executes the vehicle stop holding control when a predetermined vehicle stop holding condition is established. The vehicle stop holding condition is, for example, stop of the vehicle 10 in the vehicle stop holding control on-state. The vehicle stop holding control device controls the brake actuator 64 to hold the stopped state of the vehicle when the vehicle 10 stops along with the brake operation by the driver in the vehicle stop holding control on-state. According to this, the vehicle 10 can hold the stopped state thereof even when the driver takes his/her foot off the brake pedal 61.

The vehicle stop holding control is canceled when the driver who takes his/her foot off the brake pedal 61 performs the brake operation. For example, when the vehicle stop holding control device detects a brake-on signal, this judges that cancel operation of the vehicle stop holding control by the brake operation is performed. Then, the vehicle stop holding control device controls the brake actuator 64 to decrease hold brake fluid pressure applied to the wheels Wfl, Wfr, Wrl, and Wrr gradually or immediately to cancel the vehicle stop holding control. The brake-on signal is a signal output from a brake operation amount detecting unit 66 along with the brake operation, a signal input to a stop lamp switch 71 at the time of the brake operation and the like, for example. Meanwhile, the brake operation amount detecting unit 66 is configured to detect an amount of depressing operation of the brake pedal 61 (hereinafter, referred to as a "brake operation amount").

[When Vehicle Stop Holding Control Is Canceled]

Herein, the vehicle 10 stops or starts according to a brake operation mode when the vehicle stop holding control is canceled.

Figure 2:
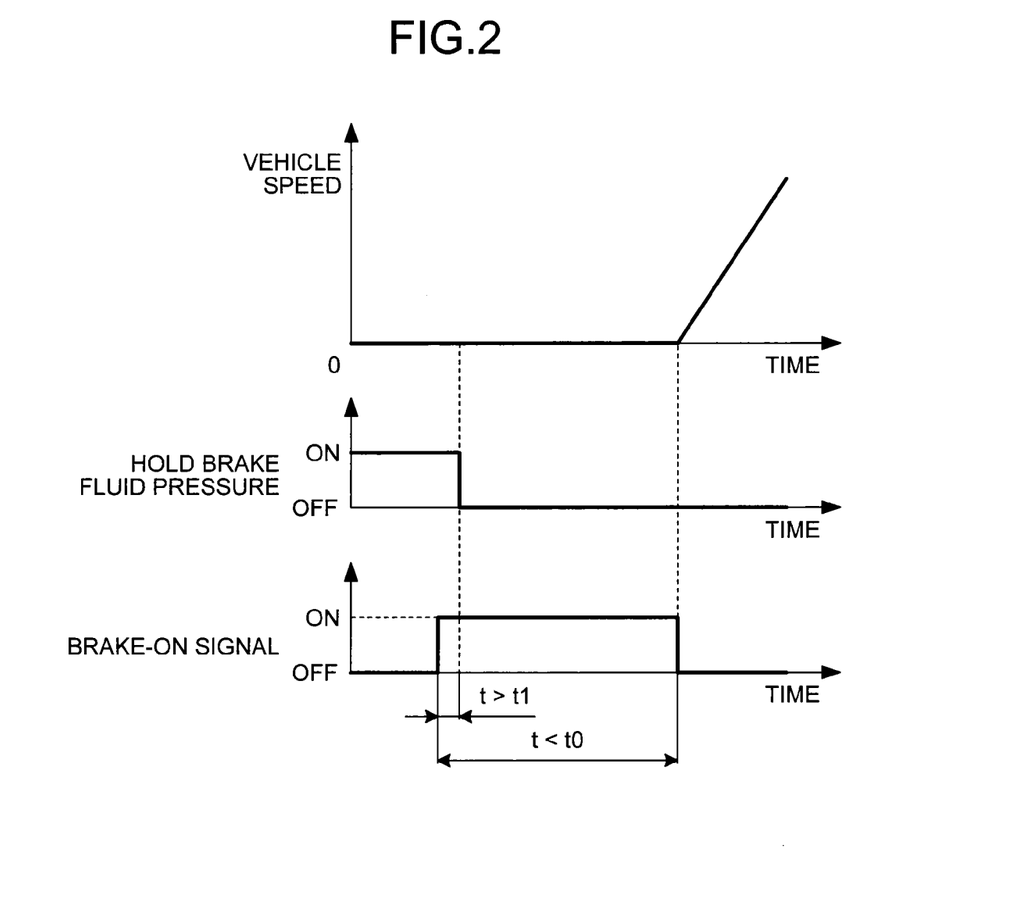
FIG. 2 is a time chart illustrating relationship between a vehicle speed and a hold brake fluid pressure when brake operation is continued after vehicle stop holding control is canceled.
Figure 3:
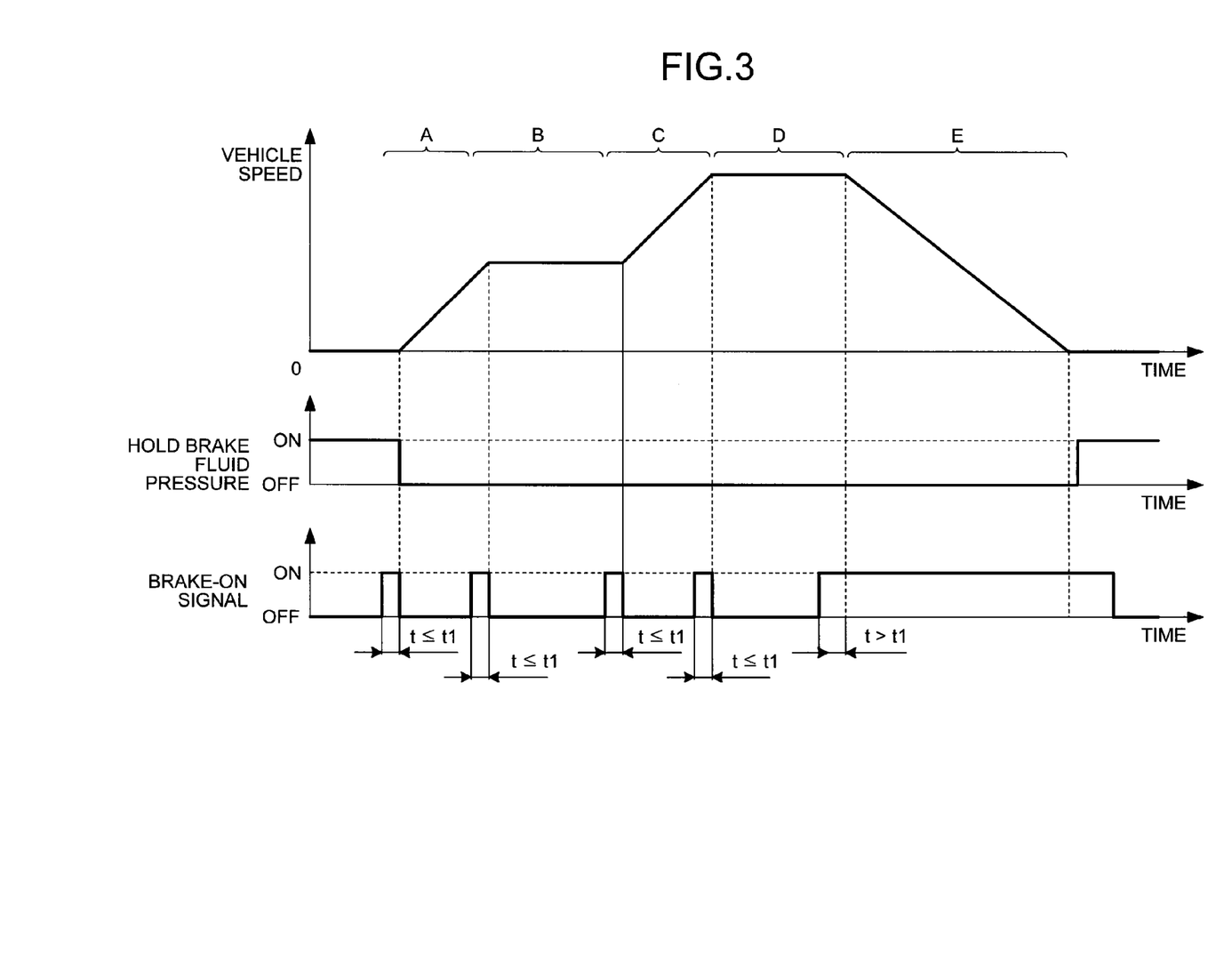
FIG. 3 is a time chart illustrating the relationship between the vehicle speed and the hold brake fluid pressure according to a brake operation mode when the vehicle is allowed to start after the vehicle stop holding control is canceled by predetermine brake operation.

First, the vehicle stop holding control device decreases the hold brake fluid pressure (ON→OFF) when the brake-on signal is detected during execution of the vehicle stop holding control to finish the vehicle stop holding control as illustrated in FIGS. 2 and 3. Although the hold brake fluid pressure is decreased after elapse of a predetermined time from the detection of the brake-on signal in FIGS. 2 and 3, it is possible to decrease the hold brake fluid pressure immediately after the brake-on signal is detected.

The driving support system disables the vehicle speed control (specifically, start control) by the braking/driving force control device and the transmission control device as the vehicle speed control devices if the brake-on signal is continuously detected for a longer time than a predetermined time. Therefore, the vehicle 10 keeps stopping because the braking force by the brake fluid pressure according to the brake operation amount or adjusted by the brake actuator 64 is generated as illustrated in FIG. 2. The predetermined time may be set to a predetermined time t1 to be described later.

Herein, in the case of the transmission 31 with which creeping is possible, the vehicle 10 might start depending on the magnitude of the braking force. Therefore, when the driver takes his/her foot off the brake pedal 61 in the stopped state of the vehicle, the vehicle 10 can start as in a conventional vehicle by decrease in the brake fluid pressure along with the brake operation as illustrated in FIG. 2. However, when the brake-on signal is continuously detected for a predetermined time t0 (>t1) or longer in the stopped state of the vehicle, the vehicle stop holding control device starts the vehicle stop holding control again. Therefore, the vehicle 10 starts when the driver takes his/her foot off the brake pedal 61 before the predetermined time t0 elapses and keeps stopping when the driver takes his/her foot off the brake pedal 61 after the elapse of the predetermined time t0. The predetermined time t0 is a threshold value for judging whether to start the vehicle stop holding control again when the stopped state of the vehicle by the brake operation continues also after the vehicle stop holding control is canceled.

On the other hand, when the brake-on signal detected during the vehicle stop holding control is detected only for a short time not longer than the predetermined time t1, the vehicle stop holding control device decreases the hold brake fluid pressure being applied to cancel the vehicle stop holding control and the braking/driving force control device and the transmission control device start the vehicle 10 by the vehicle speed control (by executing at least one of the driving force control, the braking force control, and the transmission control) (section A in FIG. 3). That is to say, in the vehicle 10, the brake pedal 61 is utilized as a switch to communicate intention of starting during the vehicle stop holding control (intention of canceling the vehicle stop holding control and intention of starting after the vehicle stop holding control is canceled) to the vehicle 10. Therefore, when starting the vehicle after the vehicle stop holding control is canceled, the driver is allowed to perform the brake operation to depress the brake pedal 61 and immediately release the same. Therefore, the predetermined time t1 may be set to a time required for such brake operation or may be obtained by adding operation error among the drivers to the time, for example. Herein, in the driving support system, a vehicle speed control execution flag is set, for example, when the vehicle speed control only by the brake operation is started. The vehicle speed control only by the brake operation is executed until the vehicle speed control execution flag is canceled.

The driving support system is provided with the vehicle speed change rate setting device, which sets a target value of the vehicle speed change rate in the vehicle speed control (hereinafter, referred to as a "target vehicle speed change rate). The vehicle speed change rate setting device is provided as one of the control functions of the electronic control unit 1. The vehicle speed control after the vehicle stop holding control is canceled is the start control, so that the vehicle speed change rate setting device sets a positive target vehicle speed change rate when the brake-on signal detected during the vehicle stop holding control is detected only for a short time not longer than the predetermined time t1. The target vehicle speed change rate is set such that the acceleration according to a start mode is realized and is preferably set such that at least a sudden start is prevented. For example, the target vehicle speed change rate is herein set to the vehicle speed change rate to realize gradually rising acceleration suited to the time of very-low speed running such as in a traffic jam.

In this manner, in the driving support system, it is possible to cancel the vehicle stop holding control and start the vehicle 10 by the depressing operation and releasing operation of the brake pedal 61 in a short time without changing to the accelerator pedal 41. Herein, at the time of the very-low speed running, there might be a situation in which it is required to decelerate or stop the vehicle immediately after the vehicle stop holding control is canceled and the vehicle is started depending on a traffic situation. However, since the driving support system enables the start with the acceleration suitable for the time of the very-low speed running, it is not required that the driver performs the brake operation again for the deceleration or the stop immediately after the start, so that operational burden of the driver can be relieved. Also, at the time of the very-low speed running, deficiency in the vehicle speed might be sensed after the vehicle stop holding control is canceled to start the vehicle depending on the traffic situation. However, since the driving support system enables the start with the acceleration suitable for the time of the very-low speed running, it is not required that the driver performs accelerator operation and the operational burden of the driver to change to the accelerator pedal 41 can be relieved. That is to say, in the driving support system, it is not required to finely adjust by changing between the brake pedal 61 and the accelerator pedal 41 to realize desired acceleration running, so that the operational burden of the diver may be relieved. Further, however well the target vehicle speed change rate is suited to the time of the very-low speed running, there also is possibility that the deceleration and the stop are required depending on the traffic situation. In the driving support system, it is not required to change to the accelerator pedal 41 under such a situation, so that it is possible to decelerate or stop the vehicle 10 by immediately performing the brake operation and the operational burden of the driver is relieved.

Herein, in the vehicle 10, it is preferable to make the acceleration smaller as an inter-vehicular distance from a vehicle in front is smaller to moderately start, for example. That is to say, since the acceleration of the vehicle 10 required at the time of the start is different depending on the traffic situation, it is desirable to make the same changeable according to the situation. Therefore, it is herein configured such that the driver can switch the acceleration. For example, an acceleration switch device 81, which the driver operates when switching to desired acceleration, is provided in the cabin of the vehicle 10. The acceleration switch device 81 may be a selection switch, a dial, a selection button displayed on a display unit such as a multi-display capable of switching setting of the acceleration, for example. When the driver operates the acceleration switch device 81, this transmits a signal according to a content of the operation to the electronic control unit 1. Then, the vehicle speed change rate setting device switches to the target vehicle speed change rate according to the signal to realize the acceleration desired by the driver. According to this, when the traffic jam is heavy and the inter-vehicular distance from the vehicle in front is small, it is switched to the target vehicle speed change rate with smaller acceleration. On the other hand, when the traffic jam is not heavy, it is switched to the target vehicle speed change rate with larger acceleration. Therefore, the driving support system can accelerate the vehicle 10 with appropriate acceleration according to the traffic situation, so that the brake operation for inhibiting excessive acceleration and the accelerator operation by the deficiency in the vehicle speed are not required, so that the operational burden of the driver is relieved.

[After Vehicle Stop Holding Control Is Canceled]

In this driving support system, the brake-on signal is detected during the acceleration running after the vehicle stop holding control is canceled illustrated in FIG. 3, and when the brake-on signal is detected only for a short time not longer than the predetermined time t1, the vehicle 10 is allowed to run at a constant speed at the vehicle speed at that time (B section in FIG. 3). That is to say, in the driving support system, the brake pedal 61 is utilized as the switch to communicate intention of running at a constant speed during the acceleration running after the vehicle stop holding control is canceled to the vehicle 10. In this case, the vehicle speed change rate setting device sets the target vehicle speed change rate to hold the vehicle speed at the time of predetermined brake operation performed by the driver. Herein, the target vehicle speed change rate is set to 0. Then, the braking/driving force control device and the transmission control device being the vehicle speed control devices execute at least one of the driving force control, the braking force control, and the transmission control to perform the vehicle speed control to realize constant-speed running at the current vehicle speed. According to this, the driving support system can relieve the operational burden of the drive because the driver is not required to finely adjust by changing between the brake pedal 61 and the accelerator pedal 41 for realizing the constant-speed running at a desired vehicle speed. Also, in the driving support system, the constant-speed running is realized without the accelerator operation, so that it is not required to change to the accelerator pedal 41 and it is possible to decelerate or stop the vehicle 10 by immediately performing the brake operation. Therefore, the driving support system enables rapid brake operation when the deceleration or the stop of the vehicle 10 is required according to the traffic situation, so that it is possible to relieve the operational burden of the driver. Meanwhile, the predetermined time at that time is not necessarily limited to the time t1 used for judging the intention of starting during the vehicle stop holding control.

Further, in the driving support system, the brake-on signal is detected during the constant-speed running, and when the brake-on signal is detected only for a short time not longer than the predetermined time t1, the vehicle speed change rate setting device sets the target vehicle speed change rate and the braking/driving force control device and the transmission control device execute at least one of the driving force control, the braking force control, and the transmission control to realize the acceleration running of the vehicle 10 at the target vehicle speed change rate (C section in FIG. 3). The target vehicle speed change rate may be identical to or different from that at the time of start acceleration after the vehicle stop holding control is canceled. The target vehicle speed change rate can be set by the driver by means of the acceleration switch device 81. According to this, the driving support system can relieve the operational burden of the driver because it is not required to finely adjust by changing between the brake pedal 61 and the accelerator pedal 41 to realize the desired acceleration running. That is to say, the driving support system can easily accelerate a driver's own vehicle along with the acceleration of the vehicle in front, for example, so that the operational burden of the driver is relieved. Also, in the driving support system, the acceleration running is realized without the accelerator operation, so that it is not required to change to the accelerator pedal 41 and it becomes possible to decelerate or stop the vehicle 10 by immediately performing the brake operation. Therefore, the driving support system enables the rapid brake operation when the deceleration or the stop of the vehicle 10 from the acceleration running is required depending on the traffic situation, so that the operational burden of the driver can be relieved.

Herein, it is preferable that the vehicle speed control only by the brake operation is executed only in a predetermined vehicle speed region. For example, the vehicle speed region is intended to mean the vehicle speed region in which changing operation between the accelerator pedal 41 and the brake pedal 61 is frequently performed and this is herein a very-low speed region in the traffic situation such as in the traffic jam. Therefore, in this driving support system, an upper limit vehicle speed is set, and when it achieves the upper limit vehicle speed, the vehicle speed change rate setting device sets the target vehicle speed change rate to 0 and allows the constant-speed running at this vehicle speed (D section in FIG. 3). The upper limit vehicle speed is set to a low vehicle speed at which the accelerator operation and the brake operation are not frequently performed in the case of the very-low speed region in the traffic jam, for example. According to this, the driving support system is capable of accelerating the vehicle 10 up to the upper limit vehicle speed with the appropriate acceleration without the accelerator operation by the driver in the very-low speed region, so that the operational burden of the driver to change to the accelerator pedal 41 can be relieved. Also, the driving support system executes the vehicle speed control only by the brake operation only in the vehicle speed region not higher than the upper limit vehicle speed, so that the vehicle 10 is allowed to run safely. It may also be configured that the driver can switch the upper limit vehicle speed in the vehicle cabin by using an upper limit vehicle speed switch device (not illustrated) similar to the acceleration switch device 81 described above.

The driving support system detects the brake-on signal during the acceleration running or the constant-speed running only by the brake operation, and when the brake-on signal is detected for a longer time than the predetermined time t1, this decelerates the vehicle 10 according to the brake operation (E section in FIG. 3). In this case, the braking force by the brake fluid pressure according to the brake operation amount or adjusted by the brake actuator 64 is generated, so that the vehicle 10 decelerates according to the braking force. Herein, it is possible to adjust the deceleration at that time by allowing the vehicle speed change rate setting device to set a negative target vehicle speed change rate. The vehicle 10 starts accelerating when the accelerator operation is performed in this decelerated state or finally stops when the brake operation is continued. It is in the vehicle stop holding control on-state in this exemplification, so that the vehicle stop holding control device executes the vehicle stop holding control after the vehicle stops. Meanwhile, in FIG. 3, deceleration operation after the constant-speed running at the upper limit vehicle speed is illustrated.

[Second Embodiment]

A second embodiment of a driving support system according to the present invention is described with reference to FIGS. 1 and 4.

When vehicle speed control only by brake operation in the first embodiment is performed, more appropriate vehicle speed control can be performed if a condition in front of a driver's own vehicle is grasped by a vehicle side. Therefore, the driving support system of this second embodiment is provided with a forward condition confirming device capable of confirming a condition in front of the driver's own vehicle. The forward condition confirming device is provided as one of control functions of the electronic control unit 1 and this confirms the condition in front by utilizing detected information by a forward information detecting unit 85 to recognize presence of the vehicle and an obstacle in front. As the forward information detecting unit 85, that capable of at least recognizing the presence of the vehicle and the like in a predetermined area in front when the vehicle stops is used. For example, as the forward information detecting unit 85, there are an ultrasonic sensor, which uses an ultrasonic wave emitted forward, such as clearance sonar, radar, which utilizes an electromagnetic wave emitted forward, and the like, for example. An image-taking device may also be used as the forward information detecting unit 85 and the forward condition confirming device can recognize the presence of the vehicle and the like in front by applying image processing to a forward image taken by the image-taking device. It is desirable to use a low-cost forward information detecting unit 85 in each case.

Figure 4:
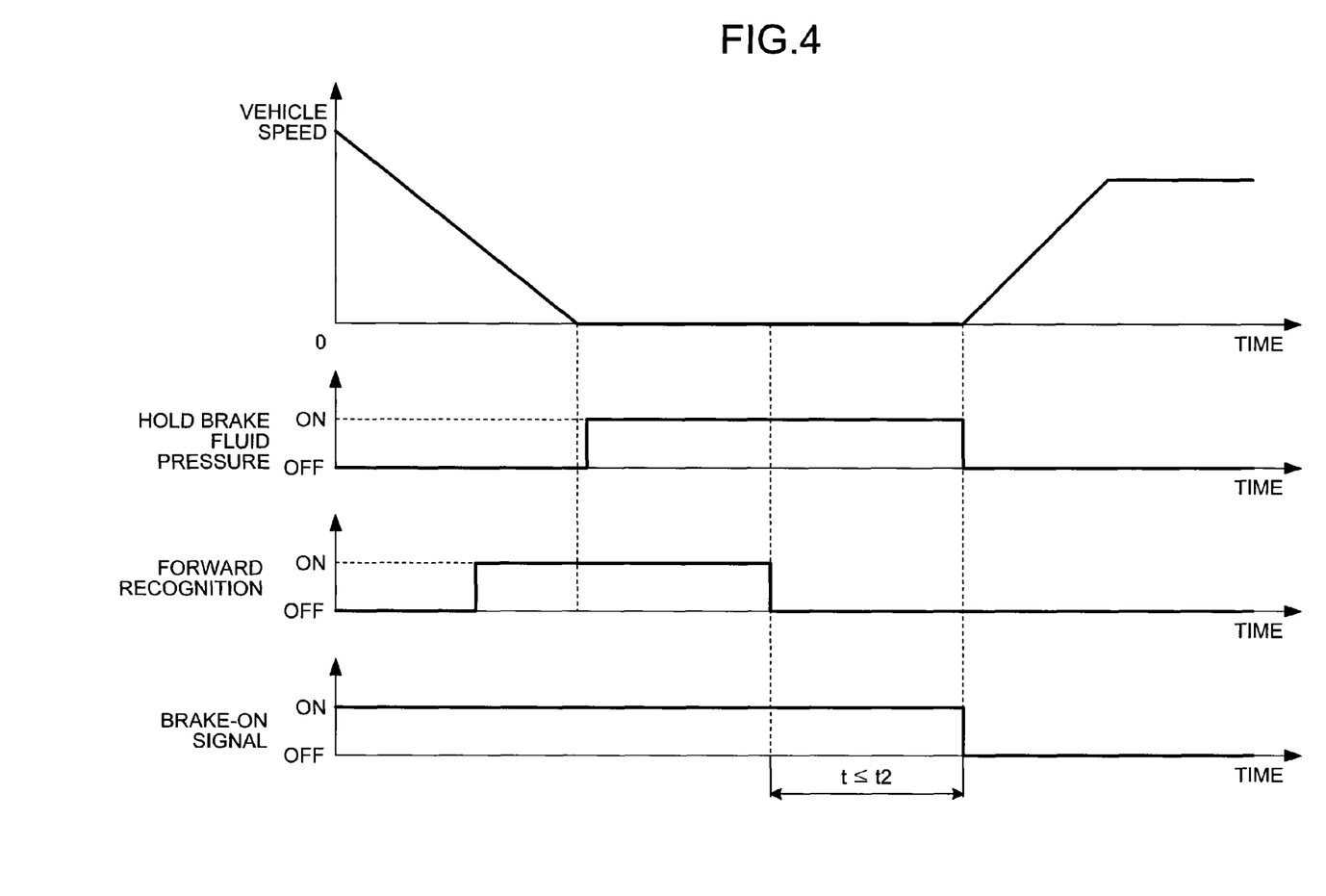
FIG. 4 is a time chart illustrating relationship among the vehicle speed, the hold brake fluid pressure, presence of a vehicle and the like in front, and a brake-on signal when the vehicle or an obstacle in front is present when the vehicle stops.

The forward condition confirming device is allowed to start confirming operation before vehicle stop holding control is started at the latest as illustrated in FIG. 4. In the driving support system, when the vehicle and the like in front recognized at the start of the vehicle stop holding control disappears from the predetermined area, thereafter, the vehicle stop holding control is finished when a driver takes his/her foot off the brake pedal 61 and a start of the vehicle 10 becomes possible. On the other hand, in the driving support system, when the forward vehicle and the like in front recognized at the start of the vehicle stop holding control is continuously present in the predetermined area, the vehicle stop holding control is continuously executed even when the driver takes his/her foot off the brake pedal 61. That is to say, as illustrated in FIG. 4, in a case in which the forward condition confirming device recognizes the vehicle and the like in front at the start of the vehicle stop holding control (forward recognition ON), when the forward condition confirming device stops recognizing the presence of the vehicle and the like in front (forward recognition OFF), the driving support system finishes the vehicle stop holding control when the brake-on signal is no longer detected. According to this, the start of the vehicle 10 becomes possible. The start may be similar to start acceleration when the vehicle stop holding control is canceled as described as an example in the first embodiment. On the other hand, when the forward condition confirming device continuously recognizes the presence of the vehicle and the like in front, the driving support system continues to execute the vehicle stop holding control even when the brake-on signal is no longer detected. According to this, the driving support system avoids an unnecessary start when the vehicle and the like are present in front of the driver's own vehicle.

In this manner, the driving support system is capable of starting the vehicle without changing from the brake pedal 61 to the accelerator pedal 41 when the vehicle and the like is no longer present in front, so that this relieves operational burden of the driver. Further, it is possible to start the vehicle 10 with acceleration suitable for the time of very-low speed running also in the driving support system, so that it is not required to finely adjust by changing between the brake pedal 61 and the accelerator pedal 41 to realize desired acceleration running, thereby relieving the operational burden of the driver.

Herein, it is preferable that the forward condition confirming device can also grasp behavior of the vehicle in front and this can calculate at least one of a distance from the vehicle and the like in front (relative position), a relative speed, and relative acceleration. According to this, a vehicle speed change rate setting device may set a target vehicle speed change rate according to a specific traffic situation understood from the distance and the like. Further, it is also possible to change an upper limit vehicle speed according to the specific traffic situation based on information such as the distance. Therefore, the driving support system can allow the vehicle 10 to more appropriately start. The target vehicle speed change rate and the upper limit vehicle speed according to the traffic situation are the vehicle speed change rate and the upper limit vehicle speed capable of holding a certain inter-vehicular distance, for example.

Also, in the driving support system, it is preferable that a period during which the vehicle can start is limited to a period from a time point at which the vehicle and the like in front disappears until a predetermined time t2 elapses as illustrated in FIG. 4. That is to say, in the driving support system, it is preferable to calculate a time from a time point at which the forward condition confirming device stops recognizing the presence of the vehicle and the like in front and finish the vehicle stop holding control to allow the vehicle 10 to start when the brake-on signal is no longer detected before the predetermined time t2 elapses. An average value and the like of an operation time by a general driver from the start of the vehicle in front to the start of the driver's own vehicle may be used, for example, as the predetermined time t2. According to this, the driver may start the vehicle 10 following movement of the vehicle in front by simple operation with little burden without changing from the brake pedal 61 to the accelerator pedal 41. On the other hand, in the driving support system, the vehicle stop holding control is continued if the brake-on signal is continuously detected after the predetermined time t2 passes. According to this, the driving support system can avoid an inadvertent start of the vehicle 10 even when the driver takes his/her foot off the brake pedal 61 when he/she does not want to start following the vehicle in front. This is because the time during which the brake pedal 61 is continuously depressed becomes longer when the driver does not want to start following the vehicle in front than that when the driver wants to follow the vehicle in front.

Also, for example, when the vehicle in front slightly moves forward, the driver sees the motion and recognizes that the vehicle in front starts. However, when the vehicle in front does not get away from the predetermined area, the forward condition confirming device continuously recognizes the presence of the vehicle in front, so that the vehicle stop holding control device cannot cancel the vehicle stop holding control and the vehicle 10 cannot start even when the foot is taken off the brake pedal 61. Therefore, it is desirable to notify the driver that the vehicle 10 is capable of starting. Therefore, an information transmitting device, which transmits information to the driver through a notifying unit 86 in a vehicle cabin, is provided as one of the control functions in the driving support system. The information transmitting device notifies the driver that the vehicle 10 is capable of starting through the notifying unit 86 when the forward condition confirming device stops recognizing the presence of the vehicle and the like in front. As the notifying unit 86, any one of a notification sound outputting unit, which outputs notification sound, such as a buzzer, a notification lamp, which notifies by visual stimulation by lighting and blinking, a sound outputting unit, which notifies that the vehicle 10 is capable of starting by sound, a display unit such as a multi-display, which displays the same, and the like may be used, for example. According to the driving support system, the driver may grasp that the vehicle 10 is capable of starting, so that a case in which this cannot start even when the foot is taken off the brake pedal 61 can be avoided. Further, the driving support system can notify the driver who erroneously recognizes that the vehicle stop holding control is continued, for example, that the vehicle is capable of starting. Therefore, the driver who does not have intention of starting does not take his/her foot off the brake pedal 61, so that the driving support system can also avoid the unnecessary start of the vehicle 10.

The driving support system of this embodiment may also execute various pieces of vehicle speed control only by the brake operation after the vehicle stop holding control is canceled in the first embodiment by utilizing a detected result by the forward condition confirming device after the vehicle 10 is allowed to start after the vehicle stop holding control is canceled. For example, in a case in which the vehicle speed change rate setting device sets the target vehicle speed change rate to hold a vehicle speed at the time of the brake operation along with predetermined brake operation during acceleration, the vehicle speed control device is allowed to perform the vehicle speed control to realize the target vehicle speed change rate if the forward condition confirming device does not detect another vehicle or the obstacle in front. Also in a case in which the vehicle speed change rate setting device sets the target vehicle speed change rate to accelerate the vehicle along with the predetermined brake operation during constant-speed running and in a case in which the vehicle speed change rate setting device sets the target vehicle speed change rate to decelerate the vehicle along with the brake operation other than the predetermined brake operation during the acceleration running or the constant-speed running (brake operation in which the brake-on signal is detected for a longer time than a predetermined time t1), the vehicle speed control device is allowed to perform the vehicle speed control such that the target vehicle speed change rate is realized when the forward condition confirming device does not detect another vehicle or the obstacle in front. On the other hand, when the forward condition confirming device detects another vehicle or the obstacle in front at the time of the predetermined brake operation during the acceleration, the predetermined brake operation during the constant-speed running, or the brake operation other than the predetermined brake operation during the acceleration running or the constant-speed running, the vehicle speed change rate setting device is preferably allowed to set the target vehicle speed change rate by utilizing the information of the vehicle and the like in front recognized by the forward condition confirming device (information such as the distance from the vehicle and the like in front). According to this, the appropriate vehicle speed control according to the specific traffic situation such as to hold a predetermined inter-vehicular distance becomes possible also in such a case.

Industrial Applicability

In this manner, the driving support system according to the present invention is useful as technology with which the driver can set the change rate of the vehicle speed by the simple operation.

Reference Signs List

1 ELECTRONIC CONTROL UNIT
10 VEHICLE
20 POWER SOURCE
31 TRANSMISSION
41 ACCELERATOR PEDAL
42 ACCELERATOR OPERATION AMOUNT DETECTING UNIT
61 BRAKE PEDAL
64 BRAKE ACTUATOR
65*fl*, 65*fr*, 65*rl*, 65*rr* BRAKING UNIT
66 BRAKE OPERATION AMOUNT DETECTING UNIT
71 STOP LAMP SWITCH
81 ACCELERATION SWITCH DEVICE
85 FORWARD INFORMATION DETECTING UNIT
86 NOTIFYING UNIT

The invention claimed is:

1. A driving support system, comprising:
a driving device configured to exert driving force on a vehicle;
a braking device configured to exert braking force on the vehicle;
a braking/driving force control device configured to perform driving force control of the driving device and braking force control of the braking device;
a vehicle stop holding control device configured to maintain a stopped state of the vehicle by braking force control performed by the braking/driving force control device;
a vehicle speed change rate setting device configured to set a target vehicle speed change rate; and
a vehicle speed control device configured to set a vehicle speed change rate of the vehicle to the target vehicle speed change rate in response to a brake pedal depressing operation by a driver, wherein
the vehicle speed change rate setting device is configured to set the target vehicle speed change rate for a start, acceleration running, or constant-speed running according to a running state or a stopped state of the vehicle when the brake pedal depressing operation is maintained by the driver for a predetermined time or less, and is configured to set a negative target vehicle speed change rate when the brake pedal depressing operation is maintained by the driver for a longer time than the predetermined time, and
the braking/driving force control device performs driving force control of the driving device and braking force control of the braking device according to the target vehicle speed change rate set by the vehicle speed change rate setting device, thereby performing the start, acceleration running, or constant-speed running of the vehicle.

2. The driving support system according to claim 1, wherein
the vehicle speed change rate setting device sets a target vehicle speed change rate to start the vehicle when the brake pedal is depressed by the driver for a predetermined time or less while the vehicle is in the stopped state.

3. The driving support system according to claim 1, wherein
the vehicle speed change rate setting device sets a target vehicle speed change rate to hold a vehicle speed at the time the brake pedal is depressed by the driver for a predetermined time or less during acceleration.

4. The driving support system according to claim 1, wherein
the vehicle speed change rate setting device sets a target vehicle speed change rate to accelerate the vehicle when the brake pedal is depressed by the driver for a predetermined time or less during constant-speed running.

5. The driving support system according to claim 3, wherein
the vehicle speed change rate setting device sets the negative target vehicle speed change rate to decelerate the vehicle when the brake pedal is depressed by the driver for a predetermined time or more during the acceleration or the constant-speed running.

6. The driving support system according to claim 1, wherein
the vehicle speed change rate setting device sets the target vehicle speed change rate in a vehicle speed region not higher than an upper limit vehicle speed.

7. The driving support system according to claim 1, further comprising:
a forward condition confirming device configured to confirm a presence of another vehicle or an obstacle in front of an own vehicle, wherein
the vehicle speed control device performs the vehicle speed control to realize the target vehicle speed change rate set by the target vehicle speed change rate setting device, when the forward condition confirming device does not detect the other vehicle or the obstacle.

8. The driving support system according to claim 1, wherein
the vehicle speed change rate setting device sets the target vehicle speed change rate according to a behavior of another vehicle in front.

9. The driving support system according to claim 8, wherein
the vehicle speed control device is configure to calculate at least one of a relative position, a relative speed, and relative acceleration, between an own vehicle and the another vehicle based on the behavior of the another vehicle.

10. The driving support system according to claim 2, wherein
the vehicle speed change rate setting device sets a target vehicle speed change rate to hold a vehicle speed at the time the brake pedal is depressed by the driver for a predetermined time or less during acceleration.

11. The driving support system according to claim 2, wherein
the vehicle speed change rate setting device sets a target vehicle speed change rate to accelerate the vehicle when the brake pedal is depressed by the driver for a predetermined time or less during constant-speed running.

12. The driving support system according to claim 3, wherein the vehicle speed change rate setting device sets a target vehicle speed change rate to accelerate the vehicle when the brake pedal is depressed by the driver for a predetermined time or less during constant-speed running.

13. The driving support system according to claim 4, wherein
the vehicle speed change rate setting device sets the negative target vehicle speed change rate to decelerate the vehicle when the brake pedal is depressed by the driver for a predetermined time or more during the acceleration or the constant-speed running.

14. The driving support system according to claim 2, wherein
the vehicle speed change rate setting device sets the target vehicle speed change rate in a vehicle speed region not higher than an upper limit vehicle speed.

15. The driving support system according to claim 3, wherein
the vehicle speed change rate setting device sets the target vehicle speed change rate in a vehicle speed region not higher than an upper limit vehicle speed.

16. The driving support system according to claim 4, wherein
the vehicle speed change rate setting device sets the target vehicle speed change rate in a vehicle speed region not higher than an upper limit vehicle speed.

17. The driving support system according to claim 5, wherein
the vehicle speed change rate setting device sets the target vehicle speed change rate in a vehicle speed region not higher than an upper limit vehicle speed.

18. The driving support system according to claim 2, further comprising:
a forward condition confirming device configured to confirm a presence of another vehicle or an obstacle in front of an own vehicle, wherein
the vehicle speed control device performs the vehicle speed control to realize the target vehicle speed change rate set by the target vehicle speed change rate setting device, when the forward condition confirming device does not detect the other vehicle or the obstacle.

19. The driving support system according to claim 3, further comprising:
a forward condition confirming device configured to confirm a presence of another vehicle or an obstacle in front of an own vehicle, wherein
the vehicle speed control device performs the vehicle speed control to realize the target vehicle speed change rate set by the target vehicle speed change rate setting device, when the forward condition confirming device does not detect the other vehicle or the obstacle.

20. The driving support system according to claim 4, further comprising:
a forward condition confirming device configured to confirm a presence of another vehicle or an obstacle in front of an own vehicle, wherein
the vehicle speed control device performs the vehicle speed control to realize the target vehicle speed change rate set by the target vehicle speed change rate setting device, when the forward condition confirming device does not detect the other vehicle or the obstacle.

* * * * *